United States Patent
Wiese et al.

(10) Patent No.: US 6,855,741 B2
(45) Date of Patent: Feb. 15, 2005

(54) COMPOSITION FOR USE IN FLEXIBLE POLYURETHANE FOAMS

(75) Inventors: Kevin D. Wiese, North Royalton, OH (US); Angela M. Knickmeyer, St. Charles, MO (US)

(73) Assignee: Ferro Corporation, Cleveland, OH (US)

( * ) Notice: Subject to any disclaimer, the term of this patent is extended or adjusted under 35 U.S.C. 154(b) by 0 days.

(21) Appl. No.: 10/436,690

(22) Filed: May 13, 2003

(65) Prior Publication Data

US 2004/0014830 A1 Jan. 22, 2004

Related U.S. Application Data

(63) Continuation of application No. 09/585,839, filed on Jun. 1, 2000, now abandoned.
(60) Provisional application No. 60/136,884, filed on Jun. 1, 1999.

(51) Int. Cl.[7] ................................................ G08G 18/28
(52) U.S. Cl. ............. 521/117; 252/182.24; 252/182.28; 521/130; 521/170
(58) Field of Search ....................... 252/182.24, 182.28; 521/117, 130, 170

(56) References Cited

U.S. PATENT DOCUMENTS 5,001,167 A * 3/1991 Wiltz et al. ................. 521/174
5,472,987 A * 12/1995 Reedy et al. ................ 521/106
5,624,968 A * 4/1997 Gabbard ...................... 521/107

* cited by examiner

*Primary Examiner*—John M. Cooney, Jr.
(74) *Attorney, Agent, or Firm*—Rankin, Hill, Porter & Clark LLP

(57) ABSTRACT

A plasticizer with a crosslinking/chain extending agent is incorporated into a water-blown flexible polyurethane foam formulation to provide acceptable softness, openness, and tensile strength characteristics. The class of plastisizers is selected from the group consisting of alkyl benzyl phthalates, phosphate esters and benzoates. The aromatic polyhydroxy compounds are a preferred class of crosslinking/chain extending agents, particularly dihydroxyaromatic compounds, more particularly resorcinol. Other classes of preferred crosslinking/extending agents are saccharides, alkyl glycosides, and alkylene oxide adducts of aliphatic triols. Other preferred crosslinker/extenders include epoxidized soybean oil, polymeric 1,3,5-trimethyl, 2-hydroxy-benzene, selected phenolic resins, selected low molecular weight adducts of a polyfunctional aliphatic amines, and polyoxyalkylene polyols wherein the hydroxyl number is less than about 200 and the average number of hydroxyl groups range from about 3 to about 8.

10 Claims, No Drawings

US 6,855,741 B2

COMPOSITION FOR USE IN FLEXIBLE POLYURETHANE FOAMS

This application is a continuation of U.S. Non-Provisional application Ser. No. 09/585,839 filed Jun. 1, 2000, now abandoned, which claims the benefit of U.S. Provisional Application No. 60/136,884, filed Jun. 1, 1999.

FIELD OF THE INVENTION

The invention relates to a method of manufacturing a flexible polyurethane foam manufactured with little solvent or other halo-carbon foaming agents, to the prepolymer used in the manufacture of the flexible polyurethane foam, and to the foam. In particular, this invention relates to combining a particular class of plasticizers with particular crosslinking or chain extending agents to make an additive, wherein said additive can be added to foam formulations in order to produce improved flexible polyurethane foam while using a combination of water and, optionally, a reduced quantity of a halogen-carbon foaming agent.

BACKGROUND OF THE INVENTION

The flexible polyurethane foam industry is being challenged by the EPA and OSHA to dramatically reduce the use of halo-carbon blowing agents, i.e., methylene chloride ($MeCl_2$), as a process chemical and reduce employee exposure in the workplace. Environmental pressures, employee safety and ever-tightening governmental regulations have shifted the flexible slabstock polyurethane foam market away from the use of conventional blowing agents such as CFC-11, methylene chloride, 1,1,1-trichloroethane, and acetone. The industry responded by developing polyurethane foam made with higher-water based formulations. The physical blowing of such high-water polyurethane foam formulations occurs primarily from the carbon dioxide given off as a result of the reaction of water and isocyanate, and to a lesser extent from the vaporization of volatiles including water resulting from the reaction exotherm. This blowing replaces the traditional foam expansion derived from the volatilization of conventional blowing agents.

The function of halo-carbons such as $MeCl_2$ in flexible polyurethane foam is twofold. Its purposes are primarily to contribute to the expansion of the reacting polymer, thereby producing a foam with a reduced density, and secondly, to remove the heat created by the exothermic nature of polyurethane reactions through its heat of vaporization.

Flexible polyurethane foam is the result of two reactions from three primary reactants, commonly a polyol, a multifunctional isocyanate, and a foaming agent, also called a blowing agent. The most common blowing agents are water and, typically, reaction products from the reaction of the isocyanate and water. The polyol and diisocyanate react to form urethane linkages, while the water and diisocyanate react to form urea and carbon dioxide ($CO_2$). This combination of soft and hard segments form a polymer matrix that is expanded by the gaseous components. In water blown foams, $CO_2$ is considered the primary blowing agent, while $MeCl_2$ or any other physical blowing agent is considered an auxiliary blowing agent.

Auxiliary blowing agents are important for foam producers because they enable softer and lower density grades of foam that permit a wider product offering. The shift to these higher-water formulations and away from conventional blowing agents has placed many additional demands on flexible slabstock foam production. Producing these products without auxiliary blowing agents necessitates pushing the formulation chemistry to enhance the production of $CO_2$. The use of higher amounts of water typically results in increased foam exotherms leading to increased foam discoloration, scorching problems and potential for fire. Also, an increased urea content is common in higher water systems, which results in higher hardness values.

This often results in foams with poor physical properties or unsafe exotherm values. A dramatic decrease in foam quality as evidenced by key physical properties of the foam such as compression sets, tensile strengths, tear strengths, and elongation values are also common in most conventional higher water systems.

Experiments with water-blown polyurethane (PU) foams that incorporate the plasticizers described in U.S. Pat. No. 5,624,968, the disclosure of which is incorporated by reference, showed some challenges exist for the product. Low densities can be reached with a combination of plasticizer and high water, but there is increased danger of fire as the level of water increases. One solution, besides adding methylene chloride to cool the foam and/or to replace some of the water, is to make low isocyanate index foams (meaning a foam having less than the stochiometric amount of isocyanate groups needed to react with all of the hydroxyl groups and water molecules present in the formulation). Low isocyanate index foams limit the potential for excess isocyanate groups to remain after the exothermic blowing and gelling reactions. These excess groups would otherwise react with atmospheric water vapor, extending the heat history of the foam. Also, the reaction of isocyanate with urethane and urea to form allophonates and biurets, respectively, contribute to the exotherm. In addition to the benefit of the reduction of fire danger, low isocyanate index foams allow lower firmness. Primarily, this is due to a decline in the amount of the hard polyurea segments produced since not all of the isocyanate reactive compounds, such as the water molecules in the formulation, will find isocyanate groups.

Unfortunately, however, it is the nature of low isocyanate index foams, whether or not they contain plasticizer, to have low integrity. Without intending to be bound to theory, an explanation is that not all of the hydroxyl groups on the polyol find isocyanate groups with which to bond. Allophanates and biurets increase PU foam integrity by increasing the crosslinked polymer matrix of the foam. Often during processing, foam with low indices (the isocyanate index, or index) has lower green strength that increases the likelihood of encountering splits, which are sizable openings within the foam. These foams frequently also have poor tear strength and tensile stress even after full cure.

The problems associated with low index foams limit the range of foam grades that can be made successfully with plasticizer alone. Low density and/or low firmness foams in all-water or reduced-methylene chloride formulations are nearly impossible to make due to integrity problems and processing difficulties.

One of the primary chemical solutions to have evolved to date is the use of low index formulation technologies, such as described in U.S. Pat. No. 4,950,694, which provides lower exotherms and lower hardness or indentation force deflection values relative to conventional index, all-water-based systems. With such low index systems, lower load foam grades can be produced without the environmentally harmful conventional and auxiliary blowing agents. These foams, however, have unacceptable commercial characteristics including poor tear strength, splitting, poor recovery properties, and poor hand.

Thus, some softer foam grades are not attainable using only water as the sole blowing agent. These higher water systems also typically are more difficult to process than the conventional lower water counterparts. These and related problems have generated several solutions to overcome the inherent pitfalls of current all-water-blown slabstock foam production technology.

U.S. Pat. No. 5,539,011 discusses an amine polyisocyanate catalyst additive that is useful in softening all-water blown flexible polyurethane foams that have commercially necessary properties. The additives are tertiary amines which contain at least one contiguous three carbon chain and should be added to the foam system at about 0.1 to 2.0 parts per hundred of polyol. The flexible PU foams described contain certain tertiary amine polyisocyanate catalysts where water is the blowing agent (and optionally using other conventional blowing agents), with an isocyanate index of 60–120, preferably 80–115, and most preferably 85–95. Furthermore, the '011 patent mentions that the foaming process can optionally be conducted in the presence of a combination of a cell opening agent, i.e. a polyethylene oxide monol and/or polyol with equivalent weight >200, and a crosslinking/extending agent, preferably a low equivalent weight (<200) polyfunctional glycol.

U.S. Pat. No. 4,950,694 describes flexible polyurethane foams prepared using water as blowing agent, and optionally other blowing agents, and a low equivalent weight, i.e., less than 200, crosslinking or chain extending agent with an isocyanate index of 60–95. Polyfunctional glycolamines, i.e. diethanolamine, are the preferred crosslinking/extending agents. The '694 patent mentions that the problem of foam splitting at low isocyanate indicies can be treated by using particular crosslinking/extending agents without introducing unacceptable tightness to the foam, and that a cell opening agent, i.e. a polyethylene oxide monol and/or polyol, is preferably incorporated.

U.S. Pat. No. 4,288,566 describes flexible PU foams prepared using water as blowing agent, and optionally other organic blowing agents, and a crosslinking agent. The isocyanate index is not directly disclosed but an excess of isocyanate is apparently used. The crosslinking agents disclosed include the ethylene glycol, glycerine, erythritol, and sugar alcohols, e.g. xylitol, sorbitol and mannitol. The '566 patent also mentions that low molecular weight, i.e., molecular weight between 32 and 400, glycols or other polyols, can be used.

U.S. Pat. No. 4,211,849 describes flexible PU foams prepared using water and/or organic propellant as blowing agent and a crosslinking agent which is a crystalline polyhydroxy compound having at least three hydroxy groups. The '849 patent discloses crosslinkers which work in the invention as well as some which do not work. The '849 patent teaches against using aromatic polyhydroxy compounds as crosslinkers.

U.S. Pat. No. 5,624,968 discloses a flexible plasticized PU foam in which water or a non-halogen gas is used as the foaming agent in conjunction with a plasticizer selected from phosphate esters, phthalates, or benzoates. The '968 patent also discloses polyol chain extenders can be used. However, the chain extenders listed therein not particularly effective, and are better suited in non-foamed PU cast elastomer systems. Specifically, all of the chain extenders listed would not retard processing at higher isocyanate indicies, but they would not work to produce commercially acceptable flexible foams at lower isocyanate indicies.

In Japanese patent application 59-226034, published Dec. 19, 1984, a method for manufacturing a foamed urethane molded article is described. A urethane foam is produced from the reaction of a polyol and an isocyanate compound using both a fluorocarbon compound and a small amount of water as the foaming agents. Both toluene diisocyanate and p,p'-diphenylmethane diisocyanate were used as the isocyanate compound. A phthalic acid plasticizer, such as the specifically discussed di-2-ethylhexyl phthalate, butyl benzyl phthalate, and dibutyl phthalate, was added to the reaction to reduce the lower mold temperature required for molding the desired articles. This Japanese application teaches the production of rigid foams, as shown by the sphere penetration test; and the plasticizers are added to reduce the required mold temperature.

What is needed in the art is a PU formulation that provides soft foams made with little or no auxiliary blowing agents but having commercially acceptable characteristics.

SUMMARY OF THE INVENTION

The invention is adding one or more crosslinking or chain extending agents to a water-blown polyurethane foam formulation containing known polyols, known isocyanates, known blowing agents, and a known class of plasticizers. A crosslinker or chain-extender is a low equivalent weight compound that contains two or more isocyanate-reactive groups such as hydroxyl, primary amine, or secondary amine groups. The flexible polyurethane foam is produced by combining predetermined quantities of each of the polyol; the multifunctional isocyanate; the non-halogen foaming agent, preferably water, or a combination of water and a halogen-containing foaming agent, e.g. methylene chloride; one or more of a class of plasticizers selected from the group consisting of phthalates, phosphate esters and benzoates; and one or more of a class of crosslinker/extenders. The aromatic polyhydroxy compounds are one of the preferred types of crosslinking/chain extending agents, i.e. dihydroxyaromatic compounds such as resorcinol (also known as 3-hydroxyphenol or 1,3 dihydroxybenzene) are preferred in the invention. Other classes of preferred crosslinking/extending agent are saccharides, alkyl glucosides, and alkylene oxide adducts of aliphatic triols.

DETAILED DESCRIPTION OF THE INVENTION

The invention relates to combining a plasticizer with a crosslinking or chain extending agent in a foam formulation.

The foams are polyurethane foams which include the following categories: Conventional foam, High Resiliency (HR) foam, Filled Foams including foams filled with reground polyurethane foam as a type of filler, High-Load-Bearing foam, and Reticulated foam as described in U.S. Pat. Nos. 3,475,525, 3,061,885, and 5,312,846, the disclosures of which are incorporated by reference.

Without being bound by theory, the concept is that the reactive groups of the crosslinker or chain-extender would bond more readily with the scarce isocyanate groups in areas where hydroxyl groups on the long polyol chains are not available, thus giving the foam more integrity. The flexible polyurethane foam is produced by combining a polyol, a multifunctional isocyanate, and a non-halogen foaming agent, preferably water, or a combination of water and a halogen containing foaming agent, e.g. methylene chloride, with one or more of a class of plasticizers and one or more of a class of crosslinker/extenders, and, optionally, in the presence of catalysts, stabiliers, and other auxiliaries and additives.

Each of these ingredients will be discussed below.

Polyols

A basic raw material for the production of polyurethane foams is the polyol, which may be an aliphatic or aromatic polyhydroxy compound, that will react with the isocyanate. This polyol may be a polyether polyol, a polyester polyol, or combinations thereof. Polyether polyols are preferred.

Any material having active hydrogens, as determined by the Zerewitinoff method, may be utilized to some extent and therefore is included within the broad definition of the polyols. Examples of such materials include, but are not limited to, graft co-polymer polyols such as styrene acrylonitrile (SAN) polyols, urea polyols, step-growth copolymer polyols such as polyisocyanate polyaddition polyols (PIPA polyols), i.e., polyols made from reacting hydrazine and toluene diisocyanate, polyharnsoff dispersion polyols (PHD polyols), and epoxy dispersion polyols.

The polyols which can be utilized in the present invention include, but are not limited to, the following polyether polyols: alkylene oxide adducts of polyhydroxyalkanes; alkylene oxide adducts of non-reducing sugars and sugar derivatives; alkylene oxide adducts of polyphenols; and alkylene oxide adducts of polyamines and polyhydroxyamines. Alkylene oxides having two to four carbon atoms generally are employed, with propylene oxide, ethylene oxide and mixtures thereof being preferred.

The polyether polyol usually has a hydroxyl functionality between 2 and 3 and a molecular weight between 1000 and 6000. The polyol or polyol blend should have an average hydroxy functionality of at least 2. The equivalent weight is determined from the measured hydroxyl number. The hydroxyl number is defined as the number of milligrams of potassium hydroxide required for the complete hydrolysis of the fully acetylated derivative prepared from one gram of polyol. The relationship between the hydroxyl number and equivalent weight is defined by the equation: $OH=56,100/$ equivalent weight, where OH equals the hydroxyl number of the polyol.

The polyols may include the poly(oxypropylene) and poly(oxyethylene-oxypropylene) triols. Ethylene oxide, when used can be incorporated in any fashion along the polymer chain. Stated another way, the ethylene oxide can be incorporated either in internal blocks, as terminal blocks, or may be randomly distributed along the polyol chain.

A portion or all of the polyol component may be added in the form of a polyol polymer in which reactive monomers have been polymerized within a polyol to form a stable dispersion of the polymer solids within the polyol.

The amount of polyol used is determined by the amount of product to be produced. Such amounts may be readily determined by one skilled in the art.

Polyether polyols are most commonly used in the production of polyurethane foams. Polyether polyols can be made by the addition reaction of alkylene oxides to such initiators as sucrose, glycerin, triethanol amine, and the like. Suitable alkylene oxides include ethylene oxide, propylene oxide, butylene oxide, isobutylene oxide, N-hexyl oxide, styrene oxide, trimethylene oxide, tetrahydrofuran, epichlorohydrin, and the like. Propylene oxide is preferred to ethylene oxide as the former yields polyether polyols with secondary hydroxyl groups. Representative examples of polyether polyols are polyether diols such as polypropylene glycol, polyethylene glycol and polytetramethylene glycol; polyether triols such as glycerol triols; polyether tetrols and pentols such as aliphatic amine tetrols and aromatic amine tetrols; polyether octols such as sucrose octol; and others such as sorbitol, trimethylol propane, and pentaerythritol.

One preferred class of polyols used in these formulations are polyether triols based upon glycerine.

The polyol can be suitable polyesters containing hydroxyl groups including, for example, the reaction products of polyhydric, preferably dihydric alcohols with the optional addition of trihydric alcohols and polybasic, preferably dibasic carboxylic acids. Examples of such carboxylic acids and their derivatives include dimerized and trimerized unsaturated fatty acids optionally mixed with monomeric unsaturated fatty acids such as oleic acid, dimethylterephthalate, terephthalic acid-bis-glycol esters, and polyalkylene terephthalate. Suitable polyhydric alcohols include glycols, e.g. ethylene glycol, propylene glycol, diethylene glycol, triethylene glycol, tetraethylene glycol, and higher polyethylene glycols and polyalkylene glycols.

Polyurethane foams are the largest single outlet for polyester polyols. Representative examples of polyester polyols used to make polyurethane foams are ethylene and diethylene glycol adipates, butanediol adipate, polytetramethylene glycol adipate, hexanediol adipate, and the polyols produced from terephthalate and derivatives thereof, including, for example, dimethyl terephthalate or the digestion product of polyethylene terephthalate, reacted with diols and triols.

Similarly, polyol compounds used in the present invention may be any of the conventional ones exemplified by aliphatic polyesterglycols such as polyethylene adipate; polybutylene adipate; polypropylene adipate and the like with extended chain length obtained by the condensation reaction between an aliphatic glycol and a dicarboxylic acid; polyalkyleneether glycols such as polypropyleneether glycol, tetramethyleneether glycol and the like obtained by the ring-opening polymerization of cyclic ethers such as ethylene oxide, propylene oxide, tetrahydrofuran and the like;

polyesterglycols obtained by the ring-opening polymerization of ε-caprolactone; diol compounds obtained by converting the terminal groups in polybutadienes into hydroxy groups; copolymers of two or more kinds of alkylene oxides; copolymers of two or more kinds of glycols and a dicarboxylic acid; polyester polyols obtained by the co-condensation of a dicarboxylic acid and a polyol such as aromatic glycols, long-chain diols, glycerin, trimethylolpropane and the like; and polyether polyols obtained by the ring-opening polymerization of a cyclic ether such as ethylene oxide, propylene oxide and tetrahydrofuran with a polyol such as glycerin or trimethylolpropane as the initiator.

These compounds are merely illustrative examples of polyol sources that may be used in connection with this invention, and it is to be understood that any known polyol source that is acceptable in the making of polyurethane may be used.

Isocyanates

Another required ingredient is multifunctional isocyanates. Toluene diisocyanate is a basic raw material in the production of polyurethane foams. Almost 80% of the toluene diisocyanate is used in the production of flexible foams and the remainder is used to produce a variety of products including insulation, adhesives and coatings. Typical foam formulations contain from 40 to 60 parts of toluene diisocyanate per one hundred parts of polyol, and the toluene diisocyanate content averages about 28% by weight of the foam that is produced.

Polyurethane foams produced from the reaction of polyols and toluene diisocyanate (TDI) are generally soft, flexible, and open-celled, and they have thus been used when flexibility is required. In the past, greater than 80% of the toluene diisocyanate produced has been used to produce flexible foams.

The predominant toluene diisocyanate is "TDI-80" which is an 80:20 mixture of the 2,4 and 2,6 isomers of toluene diisocyanate. Toluene diisocyanate is produced by the phosgenation of an 80:20 mixture of the 2,4 and 2,6 isomers of toluene diamine obtained by the reduction of a mixture of dinitrotoluenes. The initial products of the nitration of toluene are a mixture of ortho- and para-mononitrotoluene. If these isomers are separated, further nitration of the ortho isomer yields a 65:35 mixture of the 2,4 and 2,6 dinitrotoluene. In practice the mononitrotoluenes are not separated, and the nitration of this mixture yields the 80:20 mixture of 2,4 and 2,6 dinitrotoluene. Reduction provides the corresponding mixture of diamines, which is then reacted with phosgene to yield "TDI-80". As used herein, the term "toluene diisocyanate" encompasses all forms and combinations of isomers of this compound. Virtually all of the toluene diisocyanate reacts mono-functionally as the para isocyanate group is more reactive than the ortho isocyanate group.

Other isocyanates can be utilized in this invention, either in place of or in combination with toluene diisocyanate. Such isocyanate compounds are well known in the art, and are selected from, for instance, aliphatic, cycloaliphatic, and aromatic polyisocyanates, e.g., the alkylene diisocyanates and the aryl diisocyanates, and combinations thereof. Those skilled in the art are aware of properties that various isocyanates can add to a foam.

A wide variety of known isocyanate compounds may be used in this invention including esters of isocyanic acid. Any of the conventional polyisocyanates known in the art may be employed in the present invention. Examples of isocyanate sources for use with this invention include polyvalent isocyanates including diisocyanates, such as m-phenylenediisocyanate; p-phenylenediisocyanate; 2,6-trichloroethylenediisocyanate; naphthalene-1,4-diisocyanate; 2,4-trichloroethylenediisocyanate; diphenylmethane-4,4'-diisocyanate (MDI); 3,3'-dimethoxy-4,4'-biphenyl-diisocyanate; propylene-1,2-diisocyanate; 3,3'-dimethyldiphenylmethane-4,4'-diisocyanate; trimethyl-hexamethylene diisocyanate; xylenediisocyanate including xylylene-1,4-diisocyanate; hexamethylenediisocyanate; 4,4'-diphenylpropanediisocyanate; trimethylenediisocyanate; butylene-1,2-diisocyanate; cyclohexanediisocyanate; cyclohexylene-1,2-diisocyanate; cyclohexylene-1,4-diisocyanate; isophorone-diisocyanate (IPDI), dicyclohexylmethane-4,4'-diisocyanate, and the like; the aforementioned 2,4-tolylenediisocyanate (2,4-TDI); 2,6-tolylenediisocyanate (2,6-TDI); mixtures of 2,4-TDI and 2,6-TDI; dimer and trimer of 2,4-TDI; metaxylylenediisocyanate; 4,4'-biphenyldiisocyanate; diphenylether-4,4'-diisocyanate; 3,3'-ditoluene-4,4'-diisocyanate; dianisidine-diisocyanate; 4,4'-diphenylmethanediisocyanate; 3,3'-diethyl-4,4'-diphenylmethanediisocyanate; 1,5-naphthalene diisocyanate; diisothiocyanates, such as p-phenylenediisothiocyanate; xylene-1,4-diisothiocyanate; ethylidine-diisothiocyanate and the like; triisocyanates, such as triphenylmethanetriisocyanate and the like including 4,4', 4"-triphenylmethanetriisocyanate; toluene-2,4,6-triisocyanate and the like; tetraisocyanates, such as 4,4'-dimethyldiphenyl methane-2,2',5,5'-tetraisocyanate and the like; isocyanate prepolymers, such as an adduct of trichloroethylenediisocyanate with hexanetriol; an adduct of hexamethylene-diisocyanate with hexane triol; an adduct of trichloroethylenediisocyanate with hexane triol; an adduct of trichloroethylenediisocyanate with trimethylol propane, and the like. The polyisocyanates may also be used in the form of their derivatives, e.g., the reaction products with phenols, alcohols, amines, ammonia, bisulphite, HCl etc., and the polyester based isocyanate terminated prepolymer and IPDI. Individual examples of these are phenol, cresols, xylenol, ethanol, methanol, propanol, isopropanol, ammonia, methylamine, ethanolamine, dimethylamine, aniline and diphenylamine. Relatively high molecular weight addition products, e.g., of polyisocyanates with polyalcohols such as ethylene glycol, propylene glycol, trimethylolakanes or glycerol may also be used.

U.S. Pat. No. 4,636,530 discusses several polymeric isocyanates, and this disclosure is incorporated herein by reference.

These compounds are merely illustrative examples of isocyanate sources that may be used in connection with this invention, and it is to be understood that any known isocyanate source that is acceptable in the making of polyurethane may be used.

Organic isocyanates useful in producing polyurethane foam in accordance with this invention are organic compounds that contain, on average, between about one and a half and about six isocyanate groups, and preferably about two isocyanate groups.

The amount of isocyanate to be used is dependent upon the isocyanate index of foam desired and the final properties of the foam to be formed. The isocyanate index is the percent of isocyanate present compared to the moles of isocyanate-reactive compounds, expressed as a percent. If the isocyanate index is 100, then there is a stoichiometric equivalent of the amount of isocyanate needed to react with the polyol component and the other active hydrogen containing components, i.e., water, in the system. If a 3 mole percent excess of isocyanate is incorporated into the foam, then the isocyanate index is 103.

While the present invention may be practiced in a wide range of indicies, i.e., from about 80 to about 120, the preferred range of indexes is between about 90 and about 105, more preferably between about 95 to about 100.

Blowing Agents

In addition to the isocyanate and the polyol, the production of polyurethane foam requires the presence of a foaming or blowing agent. Fluorocarbon blowing agents such as trichlorofluoromethane have been used to produce foams; however, the future of the fluorocarbon blowing agents depends upon government regulations. The heat of reaction, and sometime externally applied heat, causes expansion of the fluorocarbon compound when it is used as the foaming agent. Methylene chloride has displaced most of the fluorocarbon compounds in the production of flexible foams. However, it is becoming more desirable to remove all halogen compounds from the process to meet health and environmental standards. Therefore, non-halogen containing gases such as carbon dioxide may be used. A common foaming agent, and the preferred agent for the process of this invention is water. Frequently water and an auxiliary blowing agent such as methylene chloride are used together. Water added to the reaction of the isocyanate and polyol reacts with the isocyanate to form an unstable carbamic acid which decomposes to the corresponding amine and carbon dioxide. The amine reacts with another isocyanate group to form a symmetrical disubstituted urea. Either hydrogen of the disubstituted urea may react further with another isocyanate to form a biuret which provides additional polymer branching or crosslinking. The reactions of the isocyanate with water and polyol are exothermic.

Water is preferably the sole blowing agent to produce carbon dioxide by reaction with isocyanate. Water should be used at about 0.1 to about 10 parts per hundred parts of polyol, by weight (pphp), preferably between about 2 and about 8 pphp, more preferably between about 3 and about 6.5 pphp, most preferably between about 3.5 and about 5.8. At foam indexes below 100, the stoichiometric excess of water blows via vaporization and cools the foam, and does not take part of the reaction to produce carbon dioxide.

Other blowing agents that are conventionally used in the art may be used herein, but because of the utility of the formulation large amounts of such agents are no longer needed and in many cases none are needed at all. Fluorocarbon compounds, such as trichlorofluoromethane, have been used because they expand easily when heated and they do not react with the polyol and isocyanate. Fluorocarbon compounds continue to be used in the production of some rigid foams; however, methylene chloride has displaced most of the fluorocarbon compounds in the production of flexible foams. While a goal of the present invention is to produce soft PU foams using water as the primary blowing agent, inert physical blowing agents such as trichlorofluoromethane, methylene chloride, methyl chloroform, or acetone nevertheless can be included. While the amount of inert blowing material may range from about 0 to about 30 pphp, commercially acceptable foams can generally be made using between about 0 and about 8 pphp, typically between about 0 and about 5 pphp, more typically between about 1 and about 3 pphp.

It is desired to replace as much as possible of the halogen containing foaming agent with a non-halogen foaming agent, e.g. water, carbon dioxide, formic acid, bicarbonates, and the like, and it is preferred to only use a non-halogen foaming agent.

When, as preferred in this invention, water is provided as the foaming agent, the water/isocyanate reaction generates carbon dioxide which expands to provide the expansion or foaming of the polyurethane being produced. One of the main problems involved in replacing the ozone-depleting fluorocarbon compound as blowing agent in flexible polyurethane foams with water is the increased firmness of the resulting foams. This is due to the bidentate urea groups introduced as a result of the water-isocyanate reaction. With toluene diisocyanate based flexible foams, this problem is compounded because they are selected for their softness and flexibility and the increased stiffness makes the foams less desirable. One method, as found in this invention, to obtain softer water-blown foams is to use plasticizers.

Plasticizers

The use of water as the foaming agent in flexible polyurethane foams increases the firmness of the resulting foams. A soft, flexible, plasticized water-blown polyurethane foam composition can be produced from the reaction of a polyol and toluene diisocyanate by adding a plasticizer selected from the group of phthalates, phosphate esters and benzoates to the reaction compounds. The types of plasticizers used in this invention are described in U.S. Pat. No. 5,624,968, the disclosure of which is incorporated by reference herein.

The soft, flexible, plasticized polyurethane foam composition of this invention includes a plasticizer selected from the group of phthalate plasticizers, phosphate ester plasticizers and benzoate plasticizers to the reaction compounds. These plasticizers may be added to produce a softer, more flexible polyurethane foam which, more importantly, displays good load bearing properties without significant loss of the other required strength properties.

The effective level of plasticizers is very broad. Typically, commercially acceptable soft foams will incorporate from about 0.1 to about 20 pphp. While this range is preferred, it is recognized that less plasticizer may be added and that this reduced amount of plasticizer will provide some softening effect upon the composition, and greater amounts of plasticizer may be desired in some compositions. Typically the amount is between about 0.5 pphp and about 12 pphp, preferably between about 1 pphp and about 6 pphp, more preferably between about 1.5 pphp and about 3 pphp.

Plasticizers in this invention are phthalate plasticizers such as, for example, alkyl aryl phthalates, or alkyl benzyl phthalates, including butyl benzyl phthalate, alkyl benzyl phthalate, preferably wherein the alkyl group has a carbon chain of from seven to nine carbon atoms, Texanol® benzyl phthalate, (which is 2,2,4-trimethyl-1,3-pentanediol-monobutyrate benzyl phthalate), alkyl phenyl phthalate, symmetrical and unsymmetrical dialkyl phthalates including diisononyl phihalate, diisodecyl phthalate, dioctyl phthalate, Di-n-butyl phthalate, Dioctyl phthalate, dihexyl phthalate, diheptyl phthalate, butyloctyl phthalate, linear dialkyl phthalate wherein the alkyl groups are independently carbon chains having from seven to eleven carbon atoms, and butyl cyclohexyl phthalate; phosphate ester plasticizers such as, for example, 2-ethylhexyl diphenyl phosphate, isodecyl diphenyl phosphate, mixed dodecyl and tetradecyl diphenyl phosphate, trioctyl phosphate, tributyl phosphate, butylphenyl diphenyl phosphate and isopropylated triphenyl phosphate; and benzoate plasticizers such as, for example, Texanol® benzoate (which is 2,2,4-trimethyl-1,3-pentanediol-monobutyrate benzoate), glycol benzoate, propylene glycol dibenzoate, dipropylene glycol dibenzoate, and tripropylene glycol dibenzoates.

Preferred plasticizers are the phthalate and the phosphate ester plasticizers. More preferably, the plasticizers are phthalates, even more preferably alkyl benzyl phthalates, with the most preferred plasticizer being butyl benzyl phthalate.

Crosslinker/Extender

Applicants found that it was possible to overcome physical property deficiencies of water-blown soft PU foams that contain plasticizers such as phthalates, benzoates and phosphate esters, and at the same time help avoid dangerously high exotherms, by incorporating a chain extender/crosslinker into the foam formulation at low indices.

This invention incorporates one or more specific crosslinker/extenders into the foam formulation. As used herein, the term "crosslinker" is meant to include both compounds generally known as crosslinkers and compounds generally known as chain extenders or simply extenders. Crosslinkers are compounds that contain two or more isocyanate-reactive groups, such as hydroxyl groups, primary amines, and secondary amines.

The crosslinkers/extenders were evaluated by preparing water-blown slabstock foams incorporating the plasticizer butyl benzyl phthalate, and then evaluating the foam appearance including discoloration and splits, tensile and tear strength, and other factors such as airflow that are related to stiffness. Preferred crosslinkers improved foam stabilization and tear strength. More preferred crosslinkers improved foam stabilization and tear strength without discoloring the foam. Especially preferred crosslinkers improved foam stabilization and tear strength without discoloring the foam, and also form a stable composition with butyl benzyl phthalate.

Several compounds performed well in the stabilization and tear strength tests, but are not preferred because they discolor the foam. This is a substantial handicap in foams where appearance is an important factor. In general, polyamines and alkanolamines fall into this catagory.

Several classes of compounds were found to work well. In some cases, however, particular compounds within a class performed well while other compounds perfomed markedly less well. Without being bound to any theory, it is believed that the active carbon spacing on the aromatic chain is important. For example, resorcinol provided substantially greater benefits than did the closely related compounds hydroquinone and catechol. The structures of selected preferred crosslinker/extenders are shown below.

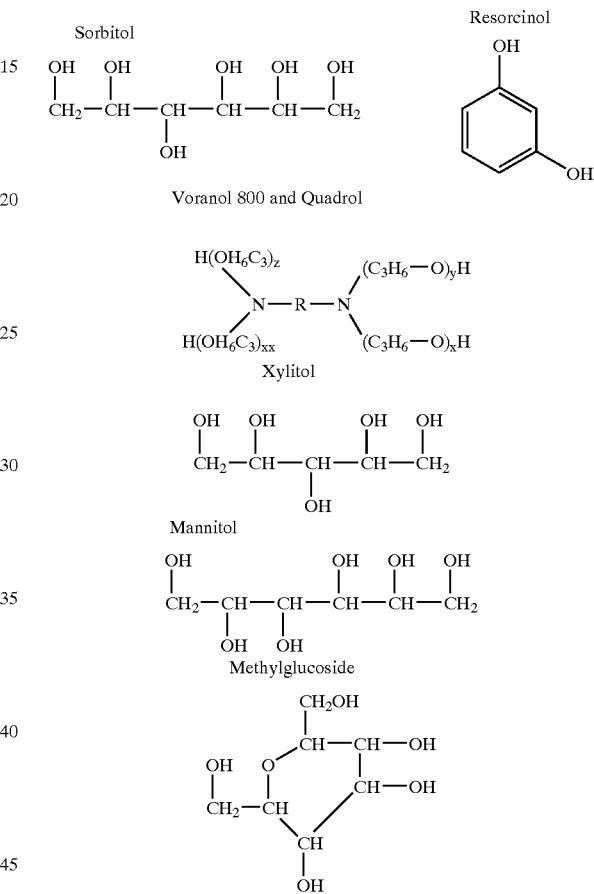

The effective chain extender or crosslinkers can be from the saccharides, which were found to be generally effective and a preferred class. This class includes sorbitol, sucrose, mannitol, ribose, xylitol, lactose, and fructose. Sorbitol and mannitol are more preferred. These compounds are not soluble in the plasticizer, but these are generally soluble in water and thus can be easily incorporated into the water-blown foam composition.

The polyamines, 4,4'-methylene-bis-(3-chloro-2,6-diethylaniline) (MCDEA) at 0.5 pphp, and amine terminated polyalkylene oxide such as JEFFAMINE® T-403 (Huntsman Co.) were found to be effective, but discolored the foam. Similar results were obtained with alkanolamines such as triethanolamine. Because of the discoloration problem, other promising amines such as diethanolamine, triisopropanolanune, diisopropanolamine, t-butyltolylenediamine, triaminonane, diethyltolylenediamine, and chlorodiaminobenzene were not tested.

Several polyhydric alcohols were tested. Only one of these, 1,3 butanediol, was found to be preferred. The 1,4 butanediol was found to be effective. But, mono-, di-, and tri-ethylene glycols, 1,2,4-butanetriol, di-propylene glycol, glycerin, trimethylolpropane, pentaerythritol, 2,5-dimethyl-1,2,6-hexanetriol, and glycerol were found to not be preferred.

A large number of polyoxyalkylene polyols were tested, and only a select few were found to be preferred. These include VORANOL® 800 (Dow), QUADROL® (BASF) tetrahydroxypropyl ethylenediamine, HUNTSMAN WL-440® (at 2 pphp), an ethoxylated trimethylolpropane PEL-RIG® 9145 and a propoxylated methyl-glucoside PEL-RIG® 9350ML were found to be effective. Others, including VORANOL® 370, VORANOL® 230-660, VORANOL® 220-530, VORANOL® 230-238, VORANOL® 520, VORANOL® 391 (Dow), ARCOL® E-746, ARCOL® LG-650, ARCOL® LHT-240 (Arco), PEG® 200, PEG® 400, PEG® 1000, PLURACOL® POLYOL 735, and PLURACOL® PEP450 (BASF), a POP derivative of pentaerythritol, were found to not be sufficiently effective to be preferred. The preferred polyoxyalkylene polyols were in a group where the hydroxyl number is less than about 200 and the average number of hydroxyl groups range from 3 to 8.

Several polyhydric aromatic compounds, including resorcinol, catechol, hydroquinone, phloroglucinol, and pyrogallol, were tested. While all were effective, recorcinol (1,3 dihydroxybenzene) and pyrogallol are more preferred. Resorcinol is especially preferred, both because it provides a foam with physical properties such as air flow and tear strength, and because resorcinol is readily soluble in the plasticizer butyl benzyl phthalate.

A large number of phenolic resins were tested. GPRI CK-2500® (from Georgia-Pacific) and PEP SET 1630® (Ashland Chemical), a polymeric 1,3,5-trimethyl, 2-hydroxy-benzene with methyl group links) are preferred.

Other compounds were found to be so effective that they are also preferred. These include PARAPLEX® G-62 (C.P. Hall), an epoxidized soybean oil, and PENACOLITE® Resin B-1A (from INDSPEC).

The aromatic polyhydroxy compounds are one of the more preferred types of crosslinking/chain extending agents, i.e. dihydroxyaromatic compounds such as resorcinol are preferred in the invention.

The crosslinking/extending agent should be present between about 0.1 and about 10 pphp and preferably, between about 0.2 and about 5 pphp. It is recognized that smaller quantities of crosslinker/extender compounds will provide some benefit, and that larger quantities are also generally effective. The specified ranges are preferred for economic as well as foam property concerns.

The efficacy of a particular crosslinker/extender and plasticizer combination will depend on many factors, including the isocyanate index, the quantity of water, and the other ingredients.

Additives

In addition to the polyol, water, isocyanate, plasticizer, and crosslinker, catalysts are usually employed in flexible PU foam slab formulations. Typically included are a tertiary amine catalyst for the blowing reaction and a tin (II) compound for the gelling reaction.

Other materials can optionally be added to the polyurethane during production to reduce problems during production or to provide desired properties in the polyurethane product. Among the additives are catalysts such as amines and metal salts; cell regulators or surfactants such as silicones to aid thorough mixing of the ingredients and to regulate cell growth, including silicon dioxide; fillers including reground PU, calcium carbonate, barium sulfate, and the like; colorants; UV stabilizers; fire retardants; bacteriostats; cell openers; and antistatic agents. It is also desirable to include stabilizers and antioxidants such as hindered amine light stabilizers and benzotriazoles.

Surfactant/Cell Openers

A surfactant, usually a polyether-polysiloxane copolymer, can optionally be included and functions as an emulsifier, nucleating agent, and foam stabilizer.

Suitable surface active agents (also known as surfactants) for slabstock applications include "hydrolyzable" polysiloxane-polyoxyalkylene block copolymers. Another useful class of foam surface active agents are the "non-hydrolyzable" polysiloxane-polyoxyalkylene block copolymers.

A cell opening agent, such as a polyethylene oxide monol or polyol of an equivalent weight greater than about 200 with a hydroxyl functionality of two or greater, may be included. For example, one cell opening agent is a polyethylene oxide adduct of glycerol of a molecular weight of about 990 gms/mole, with an equivalent weight of about 330. The cell opening agent should be present at about 0.001 to about 20 pphp.

Catalysts

The catalyst can be any suitable catalyst known to the art, for example organometallic polyurethane catalysts, used to promote the reaction of the isocyanate source with the polyol. The catalyst can be an amine, organometallic compound, an organic acid salt of a metal, a tertiary phosphine, an alkali metal compound, radical forming agents, and like catalyst used in forming polyurethanes.

Amines which may be used as the catalyst in the present invention include, for example, trialkylamines, such as triethylene amine; N,N,N',N'-tetramethyl-1,3-butanediamine; amino alcohols such as dimethyl ethanolamine; ester amines such as ethoxylamine, ethoxyldiamine, bis-(diethylethanolamine)adipate; triethylenediamine; cyclohexylamine derivatives such as N,N-dimethylcyclohexylamine; morpholine derivative such as N-methylmorpholine; and piparazine derivatives such as N,N'-diethyl-2-methylpiparazine, N,N'-bis-(2-hydroxypropyl)-2-methylpiparazine, bis(2,2'-dimethylaminoethyl)ether, and the like.

The catalysts, including 1,3,5-tris-(3-dimethylaminopropyl)-1,3,5-triazine, bis-(3-dimethylaminopropyl)methyl-amine, potassium acetate, potassium octoate, and DBU, and the methods of use of U.S. Pat. No. 5,539,011 are exemplary and are incorporated herein by reference.

Metals of organometallic compounds include, for example, tin, lead, bismuth, cadmium, cobalt, aluminum, potassium, chromium and zinc. Among them, typical embodiments of organotin compounds are dibutyltin dilaurate and dibutyltin bis(2-ethylhexanoate) and the like. As for the various organic acid salts of metals, there are, for example, organic acid salts of oleic acid, naphthoic acid, caproic acid, caprylic acid, and most other organic acids with tin, lead, bismuth, cadmium, cobalt, aluminum, potassium, chromium and zinc.

Examples of organic acid salts of tin are stannous oleate, tin 2-ethylcaproate, tin naphthoate, tin octylate and the like.

Examples of tertiary phosphines include trialkyl phosphine, dialkylbenzyl phosphine and the like.

Examples of alkali metal compounds include alkali metal hydroxides or fatty acid salts.

As the radical-forming agent, there are, for example, benzoyl peroxide, lauroyl peroxide, azobisisobutyronitrile and the like.

These catalysts may be used singly or in combination, and it may be more effective to use an amine together with an organometallic compound or an organic acid salt of a metal.

Suitable catalysts include, but are not limited to, dialkyltin salts of carboxylic acid, tin salts of organic acids, triethylene diamine, bis (2,2'-dimethylaminoethyl) ether and similar compounds that are well known to the art.

Catalysts should be present at about 0.0001 to about 5 weight percent of the reaction mixture.

Fillers/Modifiers

Solid stabilizing polymers and other additives, including flame retardants, colorants, dyes and anti-static agents, which are conventionally known in the art may be used with the formulations of the present invention. Those additives listed in U.S. Pat. No. 4,950,694 are exemplary and are incorporated herein by reference.

Other fillers and additives such as esters of aliphatic polyhydroxy compounds and unsaturated carboxylic acids may also be used. Examples are acrylates, such as ethylene glycol diacrylate; triethylene glycol diacrylate; tetramethylene glycol diacrylate; trimethylolpropane triacrylate; trimethylolethane triacrylate; pentaerythritol diacrylate; pentaerythritol triacrylate; pentaerythritol tetraacrylate; dipentaerythritol tetraacrylate; dipentaerythritol pentaacrylate; dipentaerythritol hexaacrylate; tripentaerythritol octaacrylate; glycerol diacrylate; methacrylates, such as triethylene glycol dimethacrylate; tetramethylene glycol dimethacrylate; trimethylolpropane trimethacrylate; trimethylolethane trimethacrylate; pentaerythritol dimethacrylate; pentaerythritol trimethacrylate; pentaerythritol tetramethacrylate; dipentaerythritol dimethacrylate; dipentaerythritol trimethacrylate; dipentaerythritol tetramethacrylate; tripentaerythritol octamethacrylate; ethylene glycol dimethacrylate; 1,4-butanediol dimethacrylate; sorbitol tetramethacrylate and the like; itaconates, such as ethylene glycol diitaconate; propylene glycol diitaconate; 1,2-butanediol diitaconate; tetramethylene glycol diitaconate; pentaerythritol triitaconate and the like; crotonates such as ethylene glycol dicrotonate; diethylene glycol dicrotonate; pentaerythritol tetracrotonate and the like; and maleates, such as ethylene glycol dimaleate; triethylene glycol dimaleate; pentaerythritol dimaleate and the like.

It is particularly advantageous to add an anti-oxidant, such as a hindered phenolic, i.e., IRGANOX® 1010 (Ciba-Geigy), an organic phosphite, or both, to the composition containing the plasticizer. Stabilizers such as tetrabutylhexamethylenediamine are also beneficially added.

Foam Properties

The flexible polyurethane slabstock foam contemplated herein is comprised of one or more polyols; one or more organic isocyanates; blowing agents, especially water; one or more plasticizers; one or more crosslinker/extenders, and optionally catalysts; one or more foam processing aids; anti-oxidants; and other standard ingredients known to those skilled in the art.

Airflow data provides a numerical measure of the amount of air to flow through a standard size piece of foam at a standard air pressure and temperature. This gives a measure to the relative openness or closedness of a given piece of foam. Foams with higher airflows are more open and conversely those with lower airflows are considered more closed or tighter. The airflows of the presently disclosed foams are relatively high and indicate good quality open-celled foam. Fire resistant foams would, by definition, have lower airflows. Preferred airflow for optimal physical property development ranges from about 2–6 scfm at 0.5 in. Hg per ASTM test 3574-96.

Combinations of plasticizer and crosslinking agent have a synergistic effect on the foam, giving spilt-free, stable, soft foams with high tear resistance and good air flow. It is therefore advantageous, but not necessary, that the crosslinker be soluble in the plasticizer, which may be phthalates, especially benzyl-phthalates, benzoates, and phosphate esters. In order of preference for a particular plasticizer, butyl benzyl phthalate, the preferred crosslinkers are:

1) saccharides;
2) resorcinol, which is soluble in plasticizer;
3) propoxylated methyl glucoside;
4) PEL-RIG® 9145, ethoxylated trimethylol propane;
5) GPRI CK-2500® brand phenolic resin from Georgia-Pacific;
6) selected alkanolamines and polyamines;
7) selected polyoxyalkylene type polyols, where the hydroxyl number is less than 200 and there are, on average, three to eight hydroxyl groups per molecule;
8) epoxidized soybean oil; and
9) QUADROL® (BASF), a low molecular weight PO adduct of a polyfunctional aliphatic amine.

Acceptable quality soft PU foams can be manufactured with the one or more of the plasticizers and crosslinkers either with or without the use of an auxiliary blowing agent, e.g. $MeCl_2$.

As used herein, the terms "soft" and "flexible" are defined as is customary in the art. Flexible polyurethane foam is a product primarily used as cushioning in furniture and mattresses.

The crosslinker/extender additive beneficially improves the integrity of low index foams; meanwhile, the plasticizer would provide good "hand" and physical properties along with improvements to airflow and rebound properties.

EXAMPLES

Example 1

Laboratory foams that contain the plasticizer and crosslinker/extender at 0.5 pphp were made and compared to identical foams that did not contain crosslinker/extenders. The comparative sample foam formulations were made using a formulation which includes the plasticizer. The water is set at 6.5 pphp, and the isocyanate index was set at 90, meaning there were only enough isocyanate groups to react with 90% of the isocyanate-reactive groups present in the foam formulation. This formulation generally gives a foam with no splits but with poor tear strength, i.e., less than 1.0 lb-f/in. Then, identical formulations but with the added crosslinker/extender were made. The control and crosslinker formulations for preliminary screening are listed below:

| Component | Control Formulation (pphp) | Crosslinker/Chain-extender Formulation (pphp) |
|---|---|---|
| VORANOL 3137 ® Polyol (Dow) | 100 | 100 |
| Toluene diisocyanate | 64.2 | 64.2 + enough to react with 90% of the crosslinker's reactive sites |
| Isocyanate Index | 90 | 90 |
| Water | 6.5 | 6.5 |
| DABCO ® BLV (Air Products) | 0.052 | 0.052 |
| NIAX ® L-620 (Witco OSI) | 1.00 | 1.00 |
| DABCO ® T-10 (Air Products) | 0.85 | 0.85 |
| SANTOFOAM ® 1000 (Solutia Inc.)* | 10.0 | 9.5 |
| Crosslinker or Chain Extender | 0 | 0.5 |

*Santofoam ® 1000 is a blend of modified phthalate esters and stabilizers . . .

Due to the sensitivity of foam formulations to many factors, including temperature and humidity, comparative examples were prepared at the same time the remaining samples were prepared.

A general foam-mixing procedure applies to all the foams made in the lab. The all-water blown flexible foams were prepared using standard, box pour, hand mixture methods substantially as described below. The procedure involves combining an "A" side (including polyol, Santofoam® 1000, the crosslinker or chain-extender, water, etc.) with a "B" side (including TDI and methylene chloride, if part of formulation). Once combined, the "A" and "B" sides are mixed and poured into a reaction vessel. The reaction is generally monitored for repeatability with the DAPS ultrasonic rate of rise equipment by Time Tech, Inc. The general foam-making procedure is as follows:

1. Set up a 12"×12" cake box under the DAPS machine head. The box will serve as the reaction vessel.

2. Weigh out the desired amounts of flexible polyol, water, amine catalyst, and surfactant into a 64 to 96 oz. container (the "A" side container). Also weigh out Santofoam® 1000 and a crosslinker or chain-extender if the formulation requires. The crosslinker or chain-extender should already be dissolved in the Santofoam® 1000 at correct proportions if soluble. Some of the ingredients may be weighed out together as part of a masterbatch. The masterbatch is mixed on a shaker at least 30 minutes before commencing foam-making.

3. Weigh out the desired amount of TDI into a 32 oz. polyethylene container pre-rinsed with TDI. If the formulation requires, also weigh out methylene chloride. Cover and set aside this "B" side container.

4. Weigh out the desired amount of tin catalyst into the "A" side container. The tin catalyst is weighed out last to reduce the risk of hydrolysis.

5. Start the mixer (a Servodyne mixer with 3"-diameter mixing blade at the end of an 8" shaft), giving it 2 or 3 seconds to reach full speed. Mix the "A" side contents for 10 seconds.

6. Pour the "B" side contents into the "A" side container. During addition of the "B" side contents, the "A" side container should either be lowered from the mixing blade or should be undergoing additional mixing of its contents. Mix or continue to mix the "A" side contents with the "B" side contents.

7. Ten seconds later, lower the "A" side container from the mixer blade and pour the contents into the cake box along the side closest to the mixer.

8. Watch the foam reaction for the blow off, which appears as "bubbles" across the surface of the foam.

9. Allow the foam to cure at room temperature and/or in an oven before cutting and testing.

10. Testing of laboratory-mixed foams followed the guidelines of ASTM D 3574-96. The only exception was that specimens possessing a surface area of roughly 110 in$^2$ were utilized for IFD tests. The ASTM method calls for a minimum surface area of 225 in$^2$. This deviation was justified because our purpose was to achieve a comparison of properties between foams produced on the same day.

Table 1 shows results of the preliminary evaluations of selected candidates. At this point, only one foam of each designated crosslinker or chain-extender was being mixed and poured into a 12"×12"×9" cake box on a given day. One control foam would also be made. Each foam was cured in a 70° C. oven for 30 minutes about 5 minutes after pouring. The foams were then cut open, and subjective comparisons of tear strength were made between the control foams and the crosslinker or chain-extender foams.

TABLE 1

| Name of Candidate | Type of Compound | Mol. Wt. Eq. Wt. Functionality | State Hydroxyl # # prim OH | Subjective Success in tear test | Solubility in Santofoam ® 1000 |
|---|---|---|---|---|---|
| Sorbitol | sugar alcohol C6H14O6 | 182.17 3.04 6 | Solid 1845 2 | Yes | no, but soluble in and added via water |
| 1,2,4-butanetriol | aliphatic triol C4H10O3 | 106.09 35.4 3 | Liquid 1585 2 | no | no, but added as liquid |

TABLE 1-continued

| Name of Candidate | Type of Compound | Mol. Wt Eq. Wt. Functionality | State Hydroxyl # # prim OH | Subjective Success in tear test | Solubility in Santofoam® 1000 |
|---|---|---|---|---|---|
| trimethylolpropane (TMP) | aliphatic triol C2H5C(CH2OH)3 | 134.18 44.7 3 | Solid 1255 3 | no | no, but soluble in and added via water |
| glycerine | aliphatic triol C3H8O3 | 92.9 30.7 3 | Liquid 1827 2 | no | no, but added as liquid |
| pentaerythritol | aliphatic polyfunctional alcohol C(CH2OH)4 | 136.15 34 4 | Solid 1650 4 | no | no, but soluble in and added via warm water |
| xylitol | sugar alcohol HOCH2[CH(OH)]3CH2OH | 152.15 30.4 5 | Solid 1845 2 | yes | no, but soluble in and added via water |
| mannitol | sugar alcohol optical isomer of sorbitol | 182.17 30.4 6 | Solid 1845 2 | yes | no, but soluble in and added via water |
| Triaminononane | polyfunctional amine (4-aminomethyl-1,8-octanediamine) | 173.3 57.8 3 | Liquid | possibly, unstable mix with plasticizer | yes, a green, cloudy mixture |
| Resimene® 730 (Solutia) | Melamine-formaldehyde resin | 100–200 | Liquid | no, discolored foam | yes |
| 2,5-dimethyl-1,2,6-hexanetriol | aliphatic triol C8H18O3 | 162.09 54.03 3 | Liquid 1038 2 | no | no, but added as liquid |
| fructose | monosaccharide C6H12O6 | 180 36 5 | Solid 1558 1–2 | yes, discolored foam | no, but soluble in and added via water |
| ribose | monosaccharide C5H10O5 | 150.13 37.5 4 | Solid 1496 1–2 | yes, discolored foam | no, but soluble in and added via water |
| sucrose | disaccharide C12H22O11 | 342.3 57.1 8 | Solid 982 3 | yes, discolored foam | no, but soluble in and added via water |
| lactose | disaccharide C12H22O11 | 342.3 57.1 8 | Solid 982 2 | yes, discolored foam | no, but soluble in and added via water |
| Alkamuls SMO (Rhone-Poulenc) | sorbitan monooleate (surface active agent | 3 | Liquid | no | yes, nearly at 5% |
| citric acid | polycarboxylic acid C6H8O7 | 192.12 48 4 | Solid | no, shrinkage, not cured | no, but soluble in and added via water |
| ascorbic acid | carboxylic acid C6H8O6 | 176.12 44 4 | Solid | no, shrinkage, not cured | no, but soluble in and added via water |

Example 2

Formulations were prepared and foams made following the ingredients and procedures outline in Example 1. To increase reproducibility, two foams were made for each formulation on a given day. Also, objective tear and airflow tests were conducted for each foam unless it was extremely obvious that the tear strength was unacceptable. Due to the sensitivity of foam formulations to many factors, including temperature and humidity, comparative examples were prepared at the same time the remaining samples were prepared. The foams were cured in a 70° C. oven for 30 minutes about 5 minutes after pouring, but they were usually not cut and tested until one or more days after production. The results are presented in Table 2.

The formulation is preferred if the airflow was at least about one half or more of the airflow of the control foam, where airflow in through a standard volume and is reported in cubic feet per minute, and if the tear strength is greater than about 1.0 lb-f/in.

Foams with airflows between 2.0 and 6.0 usually have the most credible properties. Sometimes, high airflow rates result from cracks not readily apparent.

Some candidates caused discoloration in the foam, probably due to oxidation reactions, and these crosslinkers are less preferred for those applications having aesthetic purposes.

Also, the candidate foams that had serious splitting problems (indicated in the comments sections) were discounted even if they had good tear strength. However, it was uncertain whether splits were related to processing or to the formulation.

The addition of crosslinker, whether it improves tear strength or not, tends to tighten the foam and reduce airflow.

TABLE 2

| Name of Product | Type of Compound | Mol. Wt. Eq. Wt. Functionality | State Hydroxyl # # prim OH | Tear of Candidate Foam | Tear of Control Foam | Airflow of Candidate Foam | Airflow of Control Foam | Solubility in Santofoam ® 1000 | Comment |
|---|---|---|---|---|---|---|---|---|---|
| resorcinol | aromatic diol | 110.11 55.1 2 | Solid 1018 0 | 1.4 | 0.7 | 4.4 | 5.6 | soluble at least at 20% | |
| Voranol 800 (Dow) | low molecular wt., PO adduct of polyfunc. aliphatic amine | 278 70.1 4 | Liquid 800 0 | 1.1 | 0.7 | 4.8 | 5.6 | soluble at least at 5% | |
| trimethylolpropane | triol | 134.18 44.7 3 | Solid 1255 3 | 0.7 | 0.7 | 3.7 | 5.6 | not at 5%-had to be introduced into the foam in water | |
| glycerine | triol | 92.09 30.7 3 | Liquid 1827 2 | 0.6 | 0.7 | 2.1 | 5.6 | not at 5%-had to be introduced into the foam in water | |
| Quadrol (BASF) | low molecular wt., PO adduct of polyfunc. aliphatic amine | 292 72.9 4 | Liquid 770 0 | 0.6 | 0.7 | 4.5 | 5.6 | soluble at least at 5% | |
| POLY bd R-20LM resin (Elf Atochem) | polybutadiene polyol | 1099 549 2 | Liquid 102.1 2 | 0.5 | 0.4 | 4.6 | 5.0 | soluble at least at 5% | |
| Voranol 230-660 (Dow) | low molecular wt., PO adduct of polyfunc alcohol | 250 85 3 | Liquid 660 0 | 0.4 | 0.4 | 3.5 | 5.0 | soluble at least at 5% | |
| Arcol LG-650 polyol (Arco) | low molecular wt., PO adduct glycerin | −258 85.9 3 | Liquid 653 0 | 0.4 | 0.4 | 3.5 | 5 | soluble at least at 20% | |
| DP1022 (1,3 butanediol) (Arco) | diol | 90.07 45 2 | Liquid 1247 1 | 0.8 | 1.1 | | | not at 5%-had to be introduced alone (since liquid) | |
| Terate 5521L (Hoechst Celanese) | polyester polyol | 354.3 147.6 2.4 | Liquid 380 2.4 | estimated poor | 1.1 | | | soluble at least at 5% | |
| PEG 100 | polyethylene glycol | 220 100 2 | Liquid 561 2 2.4 | estimated poor | estimated poor | | | soluble at least at 20% | |
| PEG 400 | polyethylene glycol | 400 200 2 | Liquid 281 2 | estimated poor | estimated poor | | | soluble at least at 5% | |
| PEG 1000 | polyethylene glycol | 1000 500 2 | Liquid 112 2 | estimated poor | estimated poor | | | soluble at least at 5% | |
| MOCA | aromatic polyfunctional amine | 267.15 133.6 2 | Solid | 0.2 | 0.2 | 3.3 | 5.3 | soluble at least at 5% | |
| ERL 4206 | epoxide | 237 | Liquid | 0.8 | 1.7 | 4.2 | 3.4 | soluble at least at 5% | |
| MCDEA | aromatic polyfunctional amine | 379 189.5 2 | Solid | 1.6 | 0.8 | 3.3 | 5.4 | soluble at least at 5% | Splits in candidate foam |
| Voranol 370 (Dow) | low molecular wt., PO adduct of sucrose, glycerine | 1042 149 7 | Liquid 370 0 | estimated poor | 1.1 | | | soluble at least at 5% | |
| Voranol 230-238 (Dow) | low molecular wt., PO adduct of polyfunc. alcohol | 700 236 3 | Liquid 238 0 | 0.3 | 0.4 | 3.8 | 5.0 | soluble at least at 5% | |
| Voranol 220-530 (Dow) | low molecular wt., PO adduct of polyfunc. alcohol | 209 106 2 | Liquid 530 0 | 0.3 | 0.4 | 3.8 | 5.0 | soluble at least at 5% | |
| Arcol LHT-240 polyol (Arco) | low molecular wt., PO adduct of glycerin | −722 240.8 3 | Liquid 233 0 | 0.3 | 0.4 | 4.4 | 5 | soluble at least at 5% | |
| Pep Set 1630 (Ashland Chemical) | phenol formaldyhde resin (in solvents) | | Liquid | 1.4 | 1.1 | | | soluble at least at 5% | discolors foam |
| Jeffamine T-403 (Huntsman) | amine-terminated polyalkylene oxide | 440 146.7 3 | Liquid | 1.8 | 1.1 | | | soluble at least at 5% | |
| phosphoric acid | inorganic acid HCPO4 | 98 32.7 | Liquid | estimated poor | estimated poor | | | not soluble at 5%-had to be | (Water solution) |

TABLE 2-continued

| Name of Product | Type of Compound | Mol. Wt. Eq. Wt. Functionality | State Hydroxyl # # prim OH | Tear of Candidate Foam | Tear of Control Foam | Airflow of Candidate Foam | Airflow of Control Foam | Solubility in Santofoam ® 1000 | Comment |
|---|---|---|---|---|---|---|---|---|---|
| | | 3 | | | | | | introduced alone (since liquid) | slow rise, incomplete cure, collapse in cure |
| Paraplex G-62 | epoxidized soybean oil | | Liquid | 1 | 1.7 | 4.1 | 3.4 | soluble at least at 5% | |
| ethylene glycol | glycol | 62.07 31 2 | Liquid 1810 2 | 0.4 | 0.7 | 3.4 | 5.6 | not soluble at 5%-had to be introduced alone (since liquid) | |
| dipropylene glycol | glycol | 134.18 67.1 2 | Liquid 836 0.2 | 0.5 | 0.7 | 4.5 | 5.6 | soluble at least at 5% | |
| Voranol 520 (Dow) | low molecular wt., PO adduct of sucrose, glycerine | 550 107.9 5.1 | Liquid 520 0 | 0.4 | 0.7 | 3.4 | 5.3 | barely soluble at 5%-not soluble at 20% | |
| Voranol 391 (Dow) | low molecular wt., PO adduct of polyfunc. amine | 575 143 4 | Liquid 391 0 | 0.5 | 0.7 | 5.1 | 5.6 | soluble at least at 5% | |
| diethylene glycol | glycol | 106.12 53.1 2 | Liquid 1056 2 | 0.3 | 0.4 | | | only soluble up to 3.5%-had to be introduced alone | |
| triethylene glycol | glycol | 150.17 75.1 2 | Liquid 747 2 | 0.2 | 0.4 | | | soluble up to 13% | |
| GPRICK-2500 (Georgia-Pacific) | phenolic resin | 161 | Solid 348 0 | 1.7 | 0.4 | | | soluble at least at 30% | |
| ARCOL E-746 (Arco) | EO/PO polyol | 334 | Liquid 168 | 0.3 | estimated poor | | | soluble at least at 5% | |
| HUNTSMAN WL 440 | low molecular wt., EO adduct of glycerine | 488 163 3 | Liquid 345 3 | 0.3 | estimated poor | | | soluble at least at 5% | |
| 1,4-cyclohexane-dimethanol-R | aliphatic diol C6H10(CH2OH)2 | 144.21 72.1 2 | Wax 778 2 | estimated poor | estimated poor | | | not at 5%-had to be introduced into the foam in water | |
| Penacolite Resin B-1A (INDSPEC) | resorcinol-formaldehyde resin | 61.6 | Solid 911 0 | 1.9 | 0.7 | 1.1 | 4.8 | soluble at least at 5% | turned foam pink |
| RG 511 (C.P. Hall Company) | polyester polyol | 197.5 2.3 | Liquid 284 | 0.5 | 0.5 | 1.9 | 2.6 | soluble at least at 5% | |
| RG 512 (C.P. Hall Company) | polyester polyol | 196.2 2.5 | Liquid 286 | 0.5 | 0.5 | 1.6 | 2.6 | soluble at least at 5% | |
| Pluracol Polyol 735 (BASF) | low molecular wt., PO adduct of TDA | 500 124.7 4 | Liquid 450 4 | 0.5 | 0.5 | 1.3 | 2.6 | soluble at least at 5% | |
| Pluracol PEP450 Polyol (BASF) | low molecular wt., PO adduct of pentacrythritol | 400 101 3.5–4 | Liquid 555 0 | 0.5 | 0.5 | | | soluble at least at 5% | |
| pyrogallol (1,2,3-benzenetriol) | aromatic triol | 126.11 42 3 | Solid 1336 0 | 2.1 | 0.4 | 0 | | soluble at least at 5% | turned foam orange |

Example 3

Formulations were prepared and foams made following the ingredients and procedures outlined in Example 1, except that the quantity of crosslinker/extender was increased from 0.5 pphp to 2.0 pphp. The results of tear strength and airflow tests on foams made from these formulations can be found in Table 3.

Several duplicates were tested that had previously been tested in Example 2. If a crosslinker seemed to work well at 0.5 pphp, it generally worked better at 2.0 pphp.

Several crosslinkers and chain-extenders are preferred. GPRI CK-2500® (a Georgia-Pacific phenolic resin), Voranol® 800 (a Dow rigid polyol), and resorcinol were preferred based on the clearly superior foam performance. BASF's CASE polyol Quadrol® and Huntsman's short-chain polyol WL 440® were also preferred due to their performance. Sorbitol, though it does not dissolve in the plasticizer like the others, produced foams with good properties. Sorbitol is preferred over mannitol and xylitol, the other insoluble sugar alcohols that performed well in the foam, because it is a less expensive compound.

Most of the preferred crosslinkers and chain-extenders have a high hydroxyl number (700 or more) in common. Several have two or more of the highly reactive primary hydroxyls; however, GPRI CK-2500 and resorcinol have only aromatic hydroxyls, considered to be the least reactive.

Finally, GPRI CK-2500 and resorcinol have hydroxyl groups on a benzene ring structure. Without meaning to be bound by theory, a ring structure configuration might allow the hydroxyl groups on a candidate to have better access to bonding with two or more isocyanate groups that have not found flexible polyol hydroxyls or water molecules.

TABLE 3

| Name of Product | Type of Compound | Mol. Wt. Eq. Wt. Functionality | State Hydroxyl # # prim OH | Tear of Candidate Foam | Tear of Control Foam | Airflow of Candidate Foam | Airflow of Control Foam | Solubility in Plasticizer | Comment |
|---|---|---|---|---|---|---|---|---|---|
| resorcinol | aromatic diol | 110.11 55.1 2 | Solid 1018 0 | 3.3 | 0.3 | | | soluble at least at 20% | used 0.59 phr T-10 instead of 0.85 phr T-10 |
| resorcinol | aromatic diol | 110.11 55.1 2 | Solid 1018 0 | 3.6 | 0.7 | 1.6 | 4.2 | soluble at least at 20% | used 1.5 phr resorcinol instead of 2.0 phr resorcinol |
| resorcinol | aromatic diol | 110.11 55.1 2 | Solid 1018 0 | 3.1 | 0.9 | 0.9 | 5.7 | soluble at least at 20% | used 1.6 phr resorcinol, 0.59 phr T-10 instead of 2.0 phr reso, 0.85 phr T-10 |
| Voranol 800 (Dow) | low molecular wt., PO adduct of poly. aliphatic amine | 278 70.1 4 | Liquid 800 0 | 1.7 | 0.9 | 0.5 | 3.4 | soluble at least at 15% | used 1.5 phr Voranol 800 instead of 2.0 phr Voranol 800 |
| trimethylolpropane (TMP) | aliphatic triol | 134.18 44.7 3 | Solid 1255 3 | estimated poor | 0.2 | | 5.3 | not at 5%-had to be introduced into the foam in water | |
| glycerine | triol | 92.09 30.7 3 | Liquid 1827 2 | estimated poor | 0.2 | | 4.7 | not at 5%-had to be introduced into the foam in water | "apple core" foam (very shrunken due to tightness) |
| Quadrol (BASF) | low molecular wt., PO adduct of poly. aliphatic amine | 292 72.9 4 | Liquid 770 0 | 0.8 | 0.3 | 1.0 | 5.4 | soluble at least at 20% | |
| Quadrol (BASF) | low molecular wt., PO adduct of polyfunc. aliphatic amine | 292 72.9 4 | Liquid 770 0 | 2.4 | 0.5 | 4.7 | 6.1 | soluble at least at 20% | used 0.65 phr T-10 instead of 0.8 phr T-10 |
| Arcol LG-650 polyol (Arco) | low molecular wt., PO adduct of glycerin | ~258 85.9 3 | Liquid 653 0 | estimated poor | 0.3 | 1.4 | 5.4 | soluble at least at 20% | |
| triethanolamine | polyfunctional alcoholamine | 149.19 49.7 3 | Liquid 1129 3 | 0.8 | 0.2 | 0.4 | 3.3 | not at 5%, but added as liquid | |
| Terate 5521L (Hoechst Celanese) | polyester polyol | 354.3 147.6 2.4 | Liquid 380 2.4 | 0.3 | 0.4 | 2.4 | 5 | soluble at least at 20% | |
| ERL 4221 | epoxide | 252 | Liquid | 0.5 | 0.8 | 4.6 | 5.4 | soluble at least at 20% | |
| MCDEA | aromatic polyfunctional amine | 379 189.5 2 | Solid | estimated poor | 0.8 | | 5.4 | collapse | |
| Voranol 370 (Dow) | low molecular wt., PO adduct of sucrose, glycerine | 1042 149 7 | Liquid 370 0 | 0.4 | 0.3 | 3.1 | 5.4 | soluble at least at 20% | |
| Voranol 220–530 (Dow) | low molecular wt., PO adduct of polyfunc. alcohol | 209 106 2 | Liquid 530 0 | 0.2 | 0.3 | 2.2 | 5.4 | soluble at least at 20% | |
| Arcol LHT-240 polyol (Arco) | low molecular wt., PO adduct of glycerin | ~722 240.8 3 | Liquid 233 0 | 0.4 | 0.4 | 3.9 | 5 | soluble at least at 20% | |
| Jeffamine T-403 (Huntsman) | amine-terminated polyalkylene oxide | 440 146.7 3 | Liquid | 2.8 | 1.0 | 1.2 | 5.4 | soluble at least at 20% | possible tendency to split and to discolor foam |
| Paraplex G-62 | epoxidized soybean oil | | Liquid | 1.7 | 0.8 | 5.2 | 5.4 | soluble at least at 20% | splits |
| Voranol 520 (Dow) | low molecular wt., PO adduct of sucrose, glycerine | 550 107.9 5.1 | Liquid 520 0 | 0.4 | 0.7 | 1.1 | 5.3 | not at 20%, added as liquid | |

TABLE 3-continued

| Name of Product | Type of Compound | Mol. Wt. Eq. Wt. Functionality | State Hydroxyl # # prim OH | Tear of Candidate Foam | Tear of Control Foam | Airflow of Candidate Foam | Airflow of Control Foam | Solubility in Plasticizer | Comment |
|---|---|---|---|---|---|---|---|---|---|
| Voranol 391 (Dow) | low molecular wt., PO adduct of polyfunc. amine | 575 143 4 | Liquid 391 0 | 0.3 | 0.3 | 2.1 | 5.4 | soluble at least at 20% | |
| triethylene glycol (TEG) | glycol | 150.17 75.1 2 | Liquid 747 2 | 0.2 | 0.7 | 1.0 | 4.8 | soluble at least at 13% | used 1.3 phr TEG, 1.1 phr T-10 instead of 2.0 phr TEG, 0.85 phr T-10 |
| GPRI CK-2500 (Georgia-Pacific) | phenolic resin | 161 | Solid 348 0 | 1.7 | 0.4 | | | soluble at least at 30% | used 0.59 phr T-10 instead of 0.85 phr T-10 |
| GPRI CK-2500 (Georgia-Pacific) | phenolic resin | 161 | Solid 348 0 | 3.2 | 0.9 | 4.2 | 5.7 | soluble at least at 30% | used 1.6 phr GP2500, 0.59 phr T-10 instead of 2.0 phr GP2500, 0.85 phr T-10 |
| Huntsman WL 440 | low molecular wt., EO adduct of glycerine | 488 163 3 | Liquid 345 3 | 1.6 | 0.7 | 4 | 4.8 | soluble at least at 20% | used 1.1 phr T-10 instead of 0.85 phr T 10 |
| CHDM-D (cyclohexane-dimethanol-D) | aliphatic diol C6H10(CH2OH)$^2$ | 144.21 72.1 2 | Wax 778 2 | estimated poor | 0.2 | | 5.3 | soluble at least at 20% | |

Example 4

Foams were prepared in a series of laboratory trials.

Voranol 800® (Dow) showed less potential than resorcinol and GPRI CK-2500® (Georgia-Pacific), and Voranol 800 is similar chemically to Quadrol® (BASF). Therefore, Voranol 800 was not tested. The others were tried in the lab in an 0932 formulation, meaning a formulation that has a density of about 0.9 pcf and an IFD, or measure of firmness, of about 32—both tests defined by ASTM D3574-96. Foams prepared without a crosslinker/extender resulted in unacceptable foam quality. The test candidates and results of tests on these foams are shown in Table 4.

TABLE 4

| | Control | Sorb | Reso-0.4 | Reso-1.6 | 2500 | WL 440 | Quad |
|---|---|---|---|---|---|---|---|
| Component (lbs/hr) | | | | | | | |
| Voranol ® 3137 (Dow) | 75 | 75 | 75 | 75 | 75 | 75 | 75 |
| Arcol ® HS 100 (Arco) | 25 | 25 | 25 | 25 | 25 | 25 | 25 |
| TDI | 70.5 | 64.3 | 63.9 | 65.6 | 63.5 | 64.1 | 65.0 |
| Water | 5.85 | 6.5 | 6.5 | 6.5 | 6.5 | 6.5 | 6.5 |
| Dabco ® BLV (Air Products) | 0.064 | 0.05 | 0.05 | 0.05 | 0.05 | 0.05 | 0.05 |
| Niax ® L-620 (Witco OSI) | 1.10 | 1.10 | 1.10 | 1.10 | 1.10 | 1.10 | 1.10 |
| Dabco ® T-10 (Air Products) | 0.59 | 0.62 | 0.72 | 0.62 | 0.72 | 0.72 | 0.72 |
| Santofoam ® 1000 (SF) | | 7.2 | | | | | |
| Sorbitol/propylene glycol* 50/50 | | 0.8 | | | | | |
| SF/resorcinol 95/5 | | | 8.0 | | | | |
| SF/resorcinol 80/20. | | | | 8.0 | | | |
| SF/GPRI CK-2500 ® 95/5 | | | | | 8.0 | | |
| SF/WL 440 ® 80/20 | | | | | | 8.0 | |
| SF/Quadrol ® 80/20 | | | | | | | 8.0 |
| Methylene Chloride | 12.0 | 7.0 | 7.0 | 7.0 | 7.0 | 7.0 | 7.0 |
| Physical Properties | | | | | | | |
| Density, pcf | 0.99 | 1.14 | 1.12 | 1.13 | 1.13 | 1.15 | 1.05 |
| 4" IFD-25% | 37.2 | 25.4 | 25.6 | 30.0 | 27.0 | 23.4 | 26.9 |
| Airflow, cfm | 1.5 | 3.9 | 4.1 | 4.6 | 3.3 | 6.2 | 0.9 |
| Tear, lb./in | 2.4 | 2.0 | 1.4 | 2.5 | 1.8 | 2.3 | 1.4 |
| Observations | | | | | | split | |

Sorbitol was dissolved in propylene glycol in the second sample since it does not dissolve in Santofoam® 1000. Later, it was found that a 50/50 solution of sorbitol/propylene glycol will solidify after being on the shelf for an extended period of time. Ethylene glycol can also dissolve sorbitol at a 50/50 combination, and at yet there is no evidence of solidification.

Because the WL 440® foam split, WL 440 is not a most preferred crosslinker for use with this composition, though the foam had excellent test characteristics.

Quadrol® is not a most preferred crosslinker because it seemed to be less efficient per pound added in improving tear strength in the 0932 formulation than resorcinol, CK-2500®, and sorbitol.

Sorbitol was very efficient, and it is therefore a highly preferred crosslinker.

Both resorcinol and GPRI CK-2500® (Georgia-Pacific) are highly preferred crosslinkers because they both dissolve in the Santofoam® 1000, and each did a good job at improving tear strength.

Example 5

Formulations using GPRI CK-2500 and resorcinol were prepared in a second series of pilot plant trials. Formulations incorporating resorcinol and GPRI CK-2500 at 6% and 10% in SANTICIZER® 160 (S-160) plasticizer were prepared for the next pilot plant study. S-160 is a formulation comprising an alkyl benzyl phthalate plasticizer.

The plasticizer/crosslinker (or chain-extender) blends were prepared, where the components and compositions of the blends are given in Table 5.

The general procedure was to heat the S-160 to 70–90° C., add the Irganox 1010 and the resorcinol or GPRI CK-2500 with stirring, allow the mixture to cool, and then add the tetrabutylhexamethylenediamine (TBHMD) and the Weston® 600 brand diisodecyl pentaerythritol diphosphite.

TABLE 5

| Blend (% by weight) | GPRI CK-2500 ® (Georgia-Pacific) | resorcinol | SANTICIZER 160 | WESTON ® 600 | IRGANOX ® 1010 | TBHMD |
|---|---|---|---|---|---|---|
| 5A | 6 |   | 90.4 | 2.5 | 1 | 0.1 |
| 5B | 10 |   | 86.4 | 2.5 | 1 | 0.1 |
| 5C |   | 6 | 90.4 | 2.5 | 1 | 0.1 |
| 5D |   | 10 | 86.4 | 2.5 | 1 | 0.1 |

The pilot plant trials were held just days after the preparation of the additive blends, using two troublesome formulations, a 1020-grade and a 1520-grade, to try with the "Example 5" additives. In the lab, "Example 5" foam formulations wherein the methylene chloride level was decreased by more than half were worked out to match the densities and IFD's of the 1020 and the 1520 controls. These formulations were then used for the pilot plant study. The results of the pilot plant trial are shown in Tables 6 for the 1020-grade formulations, and Table 7 for the 1520-grade formulations.

TABLE 6

|   | Control | 5A | 5B | 5C | 5D |
|---|---|---|---|---|---|
| Component//blend |   |   |   |   |   |
| Polyol-3512 MW | 100 | 100 | 100 | 100 | 100 |
| 80/20 TDI | 49.25 | 55.9 | 56.02 | 56.25 | 56.61 |
| Index | 105 | 95 | 95 | 95 | 95 |
| Water | 3.9 | 5.3 | 5.3 | 5.3 | 5.3 |
| Niax ® C232 (Witco OSI) | 0.093 | 0.08 | 0.08 | 0.08 | 0.08 |
| Niax ® L-618 (Witco OSI) | 1.5 | 1.5 | 1.5 | 1.5 | 1.5 |
| Dabco ® T-9 (Air Products) | 0.38 | 0.43 | 0.43 | 0.43 | 0.43 |
| Arco DP-1022 (Arco) | 1.0 |   |   |   |   |
| 5A |   | 6.0 |   |   |   |
| 5B |   |   | 6.0 |   |   |
| 5C |   |   |   | 6.0 |   |

TABLE 6-continued

|  | Control | 5A | 5B | 5C | 5D |
|---|---|---|---|---|---|
| 5D |  |  |  |  | 6.0 |
| Methylene Chloride | 13.0 | 6.0 | 6.0 | 6.0 | 6.0 |
| Middle Sample Tests (ASTM D 3574-96) |  |  |  |  |  |
| Density, pcf | 1.03 | 1.04 | 1.02 | 1.02 | 1.01 |
| 4" IFD-25% | 15.0 | 15.0 | 14.0 | 14.0 | 15.0 |
| 4" IFD-65% | 35.0 | 32.0 | 34.0 | 34.0 | 34.0 |
| Modulus 4"-65/25 | 2.33 | 2.13 | 2.43 | 2.43 | 2.27 |
| % Resilience | 40.0 | 38.75 | 38.75 | 33.75 | 35.0 |
| Airflow, cfm | 3.8 | 4.2 | 4.1 | 4.2 | 3.9 |
| Tensile Stress, psi | 10.9 | 5.3 | 6.2 | 4.0 | 7.2 |
| Elongation, % | 246 | 87 | 133 | 65 | 150 |
| Tear Strength, lb/in | 2.5 | 1.0 | 1.2 | 0.6 | 1.4 |
| Compression Sets 90%, 22 Hours | 48.6 | 33.2 | 28.8 | 27.3 | 46.0 |

TABLE 7

|  | Control | 5B/DP-1022 | 5D |
|---|---|---|---|
| Component/blend |  |  |  |
| Polyol-3512 MW | 100 | 100 | 100 |
| 80:20 TDI | 37.99 | 42.71 | 41.77 |
| Index | 102 | 92 | 92 |
| Water | 2.9 | 3.8 | 3.8 |
| Niax ® C232 (Witco OSI) | 0.12 |  |  |
| Dabco ® 33-LV (Air Products) |  | 0.12 | 0.12 |
| Niax ® L-618 (Witco OSI) | 1.3 | 1.3 | 1.3 |
| Dabco ® T-9 (Air Products) | 0.32 | 0.43 | 0.43 |
| Arco DP-1022 (Arco) |  | 1.0 | 1.0 |
| 5B |  | 8.0 |  |
| 5D |  |  | 8.0 |
| Methylene Chloride | 8.5 | 4.0 | 4.0 |
| Middle Sample Tests (ASTM D 3574-96) |  |  |  |
| Density, pcf | 1.41 | 1.42 | 1.39 |
| 4" IFD-25% | 16.0 | 16.0 | 18.0 |
| 4" IFD-65% | 41.0 | 41.0 | 38.0 |
| Modulus 4"-65/25 | 2.56 | 2.56 | 2.11 |
| % Resilience | 43.75 | 36.25 | 42.50 |
| Airflow, cfm | 3.89 | 3.54 | 3.90 |
| Tensile Stress, psi | 12.4 | 11.4 | 13.8 |
| Elongation, % | 254 | 298 | 276 |
| Tear Strength, lb/in | 2.3 | 2.0 | 2.9 |
| Compression Sets 90%, 22 Hours | 4.6 | 80.7 | 28.8 |
| Observations | good foam | good foam | small splits |

An adequate, split-free foam of the 1020-grade formulation could be made on a pilot plant scale with any of the four "Example 5" formulations. A possible problem concerns tear, tensile, and elongation values. These values for the foams of all four of the "Example 5" foams are lower than those of the control. Formulation 5D, with the 10% resorcinol in plasticizer, gave the highest tensile, tear, and elongation results of the four experimental foams.

The 1520-grade formulation proved to be a little more troublesome than the 1020-grade formulation in the manufacture of acceptable foams. Formulations 5A and 5C were not tried because of their lower concentrations of crosslinkers. A split-free 1520-grade foam could not be made at 92 index with the 5B formulation alone, even with different blowing catalysts: first attempted with 6 phr of Niax® C232 amine catalyst, then attempted with 6 phr of Dabco® 33-LV, a weaker amine blowing catalyst which would reduce the blowing, and finally at an increased rate of 8 phr of Dabco® 33-LV to increase the amount of crosslinker. It was only when DP-1022 (hydroxyl number=1247) was added into the foam along with the 5B additive that split-free foams were acheived. The DP-1022 is an additional crosslinker.

Without being bound by theory, it is believed that either the additional hydroxyl or the additional TDI (added because of the extra hydroxyl) provided a good foam when DP-1022 was added along with the 5B additive.

An acceptable foam was made with the SD additive without having to supplement the foam formulation with DP-1022. A few small splits were noticed. The 5D formulation has a higher hydroxyl number than the 5A formulation.

Example 6

Formulations were prepared and foams made following the procedures outlined in Example 1. The formulation 5D, containing 86.4% Santicizer® 160, 10% Resorcinol, 2.5% Weston 600, 1.0% Irganox® 1010, and 0.1% tetrabutylhexamethylenediamine (TBHMD) was used to prepare foams. The quantity of methylene chloride in the foam formulations was reduced from 13 pphp to 6 pphp for the 1120-grade foam, and from 8.5 pphp to 4 pphp for the 1523-grade foam. The foam formulations and properties are presented in Table 8.

TABLE 8

|  | 1120 Control | 1120 | 1523 Control | 1523 |
|---|---|---|---|---|
| Component / Formulation |  |  |  |  |
| Polyol - 3000 MW | 100 | 100 | 100 | 100 |
| 80/20 TDI - pphp | 48.7 | 56.9 | 37.5 | 42.2 |
| Index | 105 | 95 | 102 | 93 |
| Water | 3.9 | 5.3 | 2.9 | 3.8 |
| Methylene Chloride | 13 | 6 | 8.5 | 4 |
| Silicone | x | x | x | x |
| Tertiary Amine | y | y - 10% | y | y - 10% |
| Stannous Octoate | z | z + 13% | z | z + 20% |
| 5D formulation (OH# = 102) |  | 1.5–4.0 |  | 3.0–5.0 |
| Middle Sample Tests |  |  |  |  |
| Density, pcf | 1.10 | 1.10 | 1.51 | 1.53 |
| 4" IFD - 25% | 20.2 | 21.1 | 22.6 | 23.8 |
| Air Flow, cfm | 4.6 | 3.9 | 3.9 | 1.3 |
| Tensile, psi | 12 | 10 | 1.51 | 1.53 |
| Tear, pli | 2.4 | 1.7 | 2.9 | 2.9 |
| Elongation, % | 242 | 194 | 293 | 348 |

Each of the samples had acceptable tear resistance. All foams were acceptably soft. The samples of the invention produced comparable foams while using lower isocyanate indicies and less methylene chloride.

What is claimed is:

1. A flexible plasticized polyurethane foam produced by the reaction of a composition comprising:

a polyol;

an isocyanate;

a non-halogen foaming agent;

a plasticizer selected from the group consisting of butyl benzyl phthalate, 2,2,4-trimethyl-1,3-pentanediol-monoisobutyrate benzyl phthalate, diisononyl phthalate, dihexyl phthalate, diheptyl phthalate, and butyloctyl phthalate; and, a crosslinker/extender comprising resorcinol, wherein the quantity of said isocyanate in said foam is such that said foam has an Index of from about 90% to about 100%.

2. The foam of claim 1 wherein the isocyanate comprises toluene diisocyanate.

3. The foam of claim 1 wherein the non-halogen foaming agent comprises the reaction product of water and a portion of said isocyanate, wherein the water is added to the composition.

4. The foam of claim 3 wherein the quantity of water added to the composition is between about 0.1 to about 10 pounds per hundred pounds of said polyol.

5. The foam of claim 4 further comprising adding an auxiliary blowing agent.

6. The foam of claim 5 wherein the auxiliary blowing agent comprises a halo-carbon.

7. The foam of claim 6 wherein the auxiliary blowing agent comprises methylene chloride.

8. The foam of claim 5 wherein the quantity of auxiliary blowing agent is between about 0 and about 8 parts by weight per one hundred parts of polyol.

9. An additive for polyurethane foam formulations consisting essentially of a plasticizer selected from the group consisting of butyl benzyl phthalate, 2,2,4-trimethyl-1,3-pentanediol-monobutyrate benzyl phthalate, diisononyl phthalate, dihexyl phthalate, diheptyl phthalate, and butyloctyl phthalate, and the crosslinker/extender resorcinol.

10. An additive for polyurethane foam formulations, said additive consisting essentially of butyl benzyl phthalate and resorcinol.

* * * * *